United States Patent [19]
Highman et al.

[11] Patent Number: 6,120,814
[45] Date of Patent: Sep. 19, 2000

[54] ORGANIC NUTRITIONAL FORMULA

[75] Inventors: Jay C Highman, Westerville; Jeffery W Liebrecht, Columbus, both of Ohio

[73] Assignee: Nature's One, Inc., Westerville, Ohio

[21] Appl. No.: 09/255,606

[22] Filed: Feb. 22, 1999

[51] Int. Cl.[7] .............................. A23L 1/304; A23C 9/20
[52] U.S. Cl. ............................. 426/72; 426/73; 426/74; 426/629; 426/658; 426/801
[58] Field of Search ..................... 426/72, 73, 74, 426/629, 658, 801

[56] References Cited

U.S. PATENT DOCUMENTS

| | | | |
|---|---|---|---|
| 4,303,692 | 12/1981 | Gaull | 426/801 |
| 4,544,559 | 10/1985 | Gil et al. | 426/72 |
| 4,670,268 | 6/1987 | Mahoud | 426/72 |
| 4,894,242 | 1/1990 | Mitchell et al. | 426/598 |
| 4,994,442 | 2/1991 | Gil et al. | 514/45 |
| 5,013,569 | 5/1991 | Rubin | 426/801 |
| 5,021,245 | 6/1991 | Borschel et al. | 426/2 |
| 5,066,500 | 11/1991 | Gil et al. | 426/72 |
| 5,340,603 | 8/1994 | Neylan et al. | 426/73 |
| 5,492,899 | 2/1996 | Masor et al. | 514/47 |
| 5,700,590 | 12/1997 | Masor et al. | 426/656 |
| 5,709,888 | 1/1998 | Gil et al. | 424/522 |
| 5,897,892 | 4/1999 | Jolivet et al. | 426/74 |
| 5,912,032 | 6/1999 | Komatsu et al. | 426/74 |

OTHER PUBLICATIONS

Castle, S. Preparing Baby Foods, Bantam Books, N.Y., p. 30 & 239, 1983.

Infant formula, Chinese National Standard, National Bureau of Standards, Aug. 23, 1993, p. 1–6.

Business Guide for Dietary Supplement Industry, published by the Federal Trade Commission, Nov. 18, 1998, p. 1–17.

Federal Register, vol. 61, pp. 36208–32619, No. 132, Jul. 9, 1996.

Food Copy Test, published by the Federal Trade Commission, Nov. 18, 1998, p. 1 & 2.

Heller, Ilene, R., Dietary Supplements and DSHEA—Health Freedom or Havoc?. Center for Science in the Public Interest (Publishers), Washington, D.C., 1998, p. 1–6.

Murphy et al., Generic Copy Test of Food Health Claims in Advertising, published by the Federal Trade Commission, Nov. 1998, p. 1 & 2.

Title 21—Food and Drugs, 21 CFR Ch.1(Apr. 1, 1998 Edition), 3 pages.

*Primary Examiner*—Helen Pratt
*Attorney, Agent, or Firm*—Donald D. Nickey

[57] ABSTRACT

This invention relates to a nutritional beverage substantially free of chemical pesticides, antibiotics, hormones, herbicides, non-genetically modified plants and chemical solvents that utilizes organic brown rice syrup as a major component and a source of calcium which is natural milk mineral, or calcium lactate gluconate and mixtures thereof. The beverage preferably also contains water soluble vitamins, oil soluble vitamins, flavors and organic protein. The use of brown rice syrup and natural milk mineral in a preferred embodiment of the beverage provides a beverage with a smooth texture, a pleasant taste and a light, refreshing mouthfeel. The beverage also has excellent physical stability over shelf life.

10 Claims, No Drawings

ORGANIC NUTRITIONAL FORMULA

TECHNICAL FIELD

This invention relates to an improved nutritional formula which is "organic" and possesses highly acceptable taste and mouth feel. The nutritional formula uses organic brown rice syrup as the major source of carbohydrate and non-solvent extracted edible oils as the source of lipids.

BACKGROUND OF THE INVENTION

A growing number of individuals are turning to "organic" foods as their preferred source of nutrition. Organic foods are not genetically modified and are grown and prepared without the use of chemical pesticides, growth hormones, antibiotics, herbicides or synthetic fertilizers and are processed without the use of solvents such as hexane. Further, organic ingredient processing is like kosher processing in that separate production lines are used for organic and non-organic ingredients or special cleaning procedures are used between non-organic and organic runs.

A number of certification boards and some states, such as California, have procedures and regulations that must be followed for a food ingredient or food product to be labeled as organic. One such board is the National Organic Standards Board (NOSB). The NOSB requires organic growers not to have used chemical pesticides, herbicides or fertilizers on their land for at least three years. NOSB standards currently allow up to 5 percent of the ingredients in nutritional products labeled "organic" to be non-organic, provided those ingredients are not widely available in organic form.

The consuming public is aware that organic foods reduce the health risks associated with consuming foods that are tainted with chemical solvents, pesticides, herbicides, and the like. While adults can carefully choose their source of nutrition, infants, toddlers and children are forced to consume liquid formulas that are not organic. One aspect of the present invention is directed to an infant formula and a nutritional beverage for toddlers and children that is organic. The invention is also directed to a method to prepare such nutritional beverages.

Conventional infant formulas are derived, to a large extent, from cow's milk. After being diluted, the cow's milk is enriched with whey proteins, diverse carbohydrates such as lactose, dextrin, sucrose, maltose and starches, different mixtures of vegetable and animal fats, vitamins and minerals. These components are present in suitable amounts to meet the requirements of low birth weight newborns or term healthy infants as a sole source of nutrition during the first and second semesters of life.

Sometimes, infant formulas also contain isolated milk proteins, isolated vegetable proteins or protein hydrolyzates, from diverse sources such as casein, lactalbumin, soy and meat. Also, these infant formulas have one or more carbohydrates (sucrose, dextrin, maltose and starch), mixtures of diverse kinds of fats, minerals and vitamins, to meet not only the healthy newborns' nutritional requirements, but also of infants and children with clinical symptoms of lactose intolerance, protein intolerance and, in general, with diverse malabsorption-malnutrition syndromes.

The European Society of Pediatric Gastroenterology and Nutrition (ESPGAN), the American Academy of Pediatric (AAP), the Codex Alimentarius Mundi, and the European Community Council, among other organizations, have set forth general guidelines for the composition of infant formulas.

As used herein, the term "infant formula" is intended to refer to the well established understanding as defined in the United States Infant Formula Act, (106 and 107 C.F.R.). The term "organic" is intended to refer to a food that complies with the Federal Organic Foods Production Act (1990) or the California Organic Foods Act of 1990 or those certified by the National Organic Standards Board.

Nutritional products, other than infant formulas, such as those currently used in hospitals, are based on the utilization of diverse protein sources (casein, sodium and calcium caseinate, isolated soy protein, protein hydrolyzates and/or crystalline amino acids), mixtures of vegetable and animal fats, carbohydrates (basically glucose polymers), vitamins and minerals to meet, at least, the dietary intakes recommended for healthy individuals (Committee on Dietary Allowances, Food and Nutrition Board, Nat Acad Sci, 9th Ed, 1980).

Protein energy malnutrition (PEM) is found in many patients admitted to hospitals. This happens not only in developing countries, but also in those with a high socioeconomic level. Proper nutritional support for such patients, while not a primary mode of treatment is, nevertheless, an important factor for therapy and recovery. It is, therefore important to administer a nutritionally balanced organic diet free of contaminates such as pesticides and herbicides, adequate to the needs of the patient. This is especially true for those patients where conventional feeding is contraindicated (gastroenterological patients) or is insufficient (hypercatabolic patients). Further, these patients are at greater risk for developing complications that are associated with foods contaminated with pesticides, herbicides and chemical solvents.

BACKGROUND ART

Numerous nutritional formulas have been developed and patented over the years. Representative formulas are disclosed in the following U.S. Pat. No. 4,544,559 to Gil et al.; U.S. Pat. No. 4,670,268 to Mahmoud; U.S. Pat. No. 4,994,442 to Gil et al.; U.S. Pat. No. 5,021,245 to Borschel et al.; U.S. Pat. No. 5,066,500 to Gil et al.; U.S. Pat. No. 5,340,603 to Neylan et al.; U.S. Pat. No. 5,492,899 to Mason et al.; U.S. Pat. No. 5,700,590 to Mason et al.; and U.S. Pat. No. 5,709,888 to Gil et al. The teachings of these patents, as they evidence the state of the art, are herein incorporated by reference.

While much work has been done to prepare various nutritional formula, there has been no effort put forth to develop an organic nutritional formula. It is thus apparent that a need exists for a pleasant tasting organic nutritional formula that will provide significant levels of nutrition.

DISCLOSURE OF THE INVENTION

There is disclosed a nutritional formula, said formula comprising: 1) organic protein, said protein being of a concentration of between 10 and 25 grams per liter of formula; 2) organic lipid, said lipid being of a concentration of between 20 and 45 grams per liter of formula; 3) organic carbohydrates, said carbohydrates being of a concentration of between 60 and 110 grams per liter of formula; 4) vitamins; and 5) minerals. As used herein and in the claims the values reported per liter of formula are for a ready to feed (RTF) liquid nutritional.

The protein has as its source organic non-fat dry milk, soy protein, sodium and calcium caseinates or blends thereof; said lipid has as its source organic soy, coconut, high oleic sunflower oil or another organic vegetable oil or a blend thereof; and said carbohydrates have as their source organic brown rice syrup, corn syrup, glucose polymers, other carbohydrates or blends thereof. Preferably, the source of carbohydrates is brown rice syrup.

Preferably, the protein is of a concentration of between 15 and 21 grams per liter of formula, said lipid is of a concentration of between 23 and 40 grams per liter of formula, and said carbohydrates are of a concentration of between 70 and 110 grams per liter of formula. More preferably, said protein is of a concentration of between 15 and 20 grams per liter of formula, said lipid is of a concentration of between 24 and 38 grams per liter of formula, and said carbohydrate, preferably brown rice syrup, is at a concentration of between 75 and 110 grams per liter of formula. The inventive formula also preferably utilizes milk mineral concentrate as an additional source of calcium.

In a preferred embodiment of the invention, said protein is of a concentration of approximately 18 grams per liter of formula and has as its source non-fat dry milk and natural milk mineral concentrate; said lipid is of a concentration of approximately 35 grams per liter of formula and has as its source a blend of soy lecithin, soy oil, coconut oils, and high oleic sunflower oil; and said carbohydrate is of a concentration of approximately 78 grams per liter of formula. The preferred sources of carbohydrates are brown rice syrup and lactose. In this formula, the lipid provide up to 45% of the calories and the carbohydrates provide up to 50% of the calories in the formula.

The formula has as its preferred protein source organic non-fat dried milk or a blend thereof with caseinates (in an alternative embodiment the source of organic protein may include soy protein); said lipid has as its source organic soy oil, organic coconut oil, a organic high oleic sunflower oil and soy lecithin; and said carbohydrate is preferably organic brown rice syrup. The inventive formula also preferably uses natural milk mineral as a source of highly bio-available calcium and phosphorus.

There is further disclosed an organic nutritional beverage comprising:
 a) non-fat dry milk;
 b) natural milk mineral;
 c) brown rice syrup;
 d) high oleic sunflower oil;
 e) coconut oil;
 f) soybean oil;
 g) soy lecithin;
 h) flavor;
 i) oil soluble vitamins; and
 j) water soluble vitamins.

There is further disclosed an organic nutritional beverage additionally containing at least one of eicosapentaenoic acid (EPA) and docasahexaenoic acid (DHA).

There is also disclosed a ready-to-feed nutritional beverage comprising:
 a) water;
 b) from about 6.0 to about 10 gms of an organic brown rice syrup per 100 kcal of beverage; and
 c) from about 0.05 to about 0.5 gms per 100 kcal of a source of calcium selected from natural milk mineral, calcium lactate gluconate and mixtures thereof.

In a more preferred embodiment the beverage uses natural milk mineral as the source of calcium and contains soy lecithin. The beverage may also contain oil soluble vitamins and/or water soluble vitamins. The pH of the RTF beverage is preferably in the range of 6.8 to about 7.2 and the concentration of the natural milk mineral is about 0.15 to about 0.19 gms per 100 kcal of beverage.

SUMMARY OF THE INVENTION

The present invention is directed to an organic nutritional beverage wherein the beverage may be in the ready-to-drink form (single strength), a concentrate or a powder. The beverage according to the invention preferably contains water soluble vitamins such as pantothenic acid, biotin, vitamin $B_{12}$, folic acid, vitamin $B_6$, niacin, vitamin $B_2$, vitamin $B_1$ bioavailable iron; and oil soluble vitamins. The pH of the nutritional beverage in the range of from about 6.0 to about 8.0, with a pH of 6.5 to 7.5 being more preferred and a pH of 6.8 to 7.2 being most preferred.

As used herein, the term "beverage" refers to a liquid composition which is in a single-strength, ready-to-serve, drinkable form (RTF). Beverages of the present invention typically comprise at least 70% by weight, preferably at least 80% by weight, water. Beverages contemplated within the scope of this invention may also be obtained from adding water to concentrates and powders.

As used herein, the term "comprising" or "comprises" means various components can be cojointly employed in the beverages and concentrates of the present invention. Accordingly, the more restrictive terms "consisting essentially of" and "consisting of" are embodied in the term "comprising".

As used herein, the term "natural milk mineral" or "milk mineral concentrate" refers to an isolate from mammalian milk that comprises a high concentration of minerals, especially calcium and phosphorus. The natural milk mineral is typically produced using ultrafiltration technology on a waste stream from whey protein isolate production. A representative natural milk mineral is available from MD Foods Ingredients amba of Denmark under the name Lacprodan MM-0525. This product starts with whey which is subjected to ultrafiltration to remove the protein. The ultrafiltration permeate is then heated to create a precipitate. The precipitate is then separated, pasteurized and then spray dried. Another source of highly bioavailable calcium useful in the present invention is a mixture of calcium lactate and calcium gluconate available from Glucona B.V. of The Netherlands under the name Glucona CAL. It is a mixture of $C_{12}H_{22}O_{12}Ca$ (mol. wt. 430.4) and $C_6H_{10}O_6Ca$ (mol. wt. 218.2) and is about 10–11% calcium by weight. In general, gluconates are found in products such as toothpaste, medicines, cosmetics, paper, soap, cleaning supplies and food. Gluconates are obtained by the fermentation of glucose and operate as carriers for minerals, acidifiers and chelating agents.

It has been determined that the use of natural milk mineral such as Lacprodan® MM-0525 from MD Foods Ingredients amba, Denmark is very effective in producing the inventive beverage which contains high levels of bioavailable calcium. Lacprodan® MM-0525 has the following approximate chemical composition (% by weight):

| | |
|---|---|
| Protein | 4% max. |
| Fat | 1% max. |
| Lactose | 15% max. |
| Minerals | 70% max. |
| Moisture | 6% max. |

The mineral distribution for this product is approximately as follows (% by weight):

| | |
|---|---|
| Sodium | 1% |
| Potassium | 1.5% |
| Calcium | 25% min. |
| Magnesium | 0.5% |
| Phosphorus | 11% min. |
| Chloride | 2% |

Lacprodan® MM-0525 as a 10% by weight solution in water has a pH of 6.6–7.3 and the color in solution at a pH of 4 or less is clear.

The non-fat dry milk useful in this invention can be supplied by a limited number of commercial sources which do not use hormones, steroids or antibiotics on the cattle and only feed organic grains and grasses to the cattle. Non-fat dry milk (NFDM) is greater than 34% protein by weight and contains very low levels of fat. Commercially available sources of NFDM that are useful in the present invention are non-fat dry milk from Organic Valley Farms of La Farge, Wis.; and non-fat dry milk from Horizon Dairy of Boulder, Colo. Preferably, the inventive beverage has NFDM present in the range from about 6 to about 10 gms per 100 kcal of RTF formula.

The carbohydrate may be any carbohydrate source appropriate for use in organic beverages. However, one preferred source of organic carbohydrate is brown rice syrup. It has been found that the use of brown rice syrup is highly effective in masking the offensive flavors from the vitamins and minerals added to the beverage. Further, brown rice syrup provides a nutritional benefit compared to the empty calories associated with refined sources of carbohydrate such as sucrose and corn syrup solids. Refined sugars upon consumption go directly into the blood stream where they spike insulin levels, promote excess fat storage, elevate triglycerides, affect brain chemistry and impair absorption of trace minerals. It is preferred that the organic nutritional beverage comprise about 6–12 grams of brown rice syrup per 100 kcal of formula and most preferably from about 9–11 grams per 100 kcal of RTF formula.

The lipid content of the inventive beverage is from about 3–7 grams per 100 kcal of beverage. The major portion of the lipid is preferably provided from organically prepared soy bean oil, high oleic sunflower oil and coconut oil. Certified organic oils are preferred from non-genetically modified seeds. These oils are expeller pressed and not hexane extracted. The use of hexane to prepare edible oils is known to leave traces of residual hexane, which is unacceptable in the beverage according to this invention. Those skilled in the art will appreciate that other organic lipids can be used in the inventive beverage. Representative of another source of lipid or fatty acids that can be used in the beverage include fish oils which have high levels of certain polyunsaturated fatty acids. Fish oils are rich in fatty acids such as eicosapentaenoic acid (EPA) and docosahexaenoic acid (DHA). These fatty acids are characterized by having a double bond in the w-3-position. Arachidonic and linolenic acids are also useful fatty acids in the beverage according to the invention.

An additional aspect of the invention relates to simultaneously achieving an organic nutritional beverage that uses brown rice syrup as a novel source of carbohydrate and which contains a nutritionally significant level of vitamins. Those skilled in the nutritional arts will readily appreciate what vitamins can be used to accomplish the vitamin fortification. Representative of the vitamins useful in the present invention are niacinamide, D-calcium pantothenate, pyridoxine hydrochloride, riboflavin, thiamin mononitrate, folic acid, biotin and cyanocobalamin. The beverage of the present invention may also be supplemented with the amino acid taurine and the oil soluble vitamins A, D, E and K.

One important embodiment of the present inventive beverage is that it contains at least 15%, more preferably at least 20%, of the United Stated Recommended Daily Intake (USRDI), as established by the U.S. Food & Drug Administration, for calcium and iron in a 240 ml serving. In one embodiment of the invention the beverage provides at least 25% of the USRDI for calcium and at least 15% of the USRDI for iron in a 240 ml serving. There are well-recognized problems associated with adding such high levels of iron and calcium to foods and beverages. For example, most calcium sources tend to be rather insoluble or tend to have a "chalky" taste or mouthfeel. Iron supplements tend to discolor foodstuffs and be organoleptically unacceptable. Moreover, it is particularly difficult to formulate foods, and especially beverages, containing mixtures of calcium supplements and iron supplements, inasmuch as these minerals tend to interact. This interaction not only affects the organoleptic and aesthetic properties of the foods and beverages, but also undesirable affects the nutritional bioavailability of these minerals themselves. The present invention, in part, is based upon the discovery that the use of natural milk mineral as the source of calcium and brown rice syrup as the source of carbohydrate allows for a beverage with high levels of calcium and iron without significant detrimental impact on taste, mouthfeel and physical stability. Preferably, the iron is in the ferrous (iron II) state, however, ferric iron (iron III) is also acceptable. The ferrous iron is better tolerated and more efficiently utilized by the body than the ferric iron. The preferred form of iron is ferrous sulfate.

An additional aspect of the present invention relates to the beverage's pleasant taste and light mouthfeel. It has been determined that to achieve the goals of pleasant taste and good mouthfeel, the natural milk mineral should be used with the brown rice syrup, wherein the weight ratio of natural milk mineral to brown rice syrup range from 1:40 to 1:70.

It has been determined that to achieve the beverage's pleasant taste and mouthfeel that the use of soy lecithin is preferred as a source of lipid and an emulsifier/stabilizer. The amount of soy lecithin can range from 0.01 to 0.1 grams per 100 kcal of beverage. This approach is contrary to conventional wisdom which suggests that when high levels of calcium are added to a beverage, a conventional stabilizer should also be used. The prior art teaches that pectins, algins, hydrolyzed starches, xanthan gum and other edible gums be added. The use of these materials is contrary to the present invention as these gums cannot be organically produced. Thus, one aspect of the present invention resides in the use of an organic brown rice syrup in combination with natural milk mineral and soy lecithin to produce a beverage with high levels of calcium, a pleasant, clean tasting character, and a smooth, creamy texture with no evidence of destabilized proteins.

Further, in yet a more preferred embodiment, the beverage according to the invention uses expeller pressed oils for the source of lipid. These oils are especially preferred as they have no residual extraction solvent present.

In one embodiment the beverage according to this invention can be prepared with the following ranges of properties and components:

| ITEM | RANGE PER 100 ML SERVING AS FED GENERAL | PREFERRED |
|---|---|---|
| Energy (kcal) | 50–90 | 60–80 |
| Protein (gm) | 1–4 | 1.5–3 |
| Carbohydrate (gm) | 5–10 | 6–9 |
| Fat (gm) | 2–5 | 3–4 |
| Calcium (mg) | 70–150 | 85–105 |
| Iron (mg) | 0.5–2 | 1–2 |
| Vitamin C (mg) | 10–20 | 12–16 |
| Vitamin $B_1$ (mcg) | 50–90 | 60–80 |
| Vitamin $B_2$ (mcg) | 50–90 | 60–80 |
| Niacin (mcg) | 700–900 | 725–825 |
| Vitamin $B_6$ (mcg) | 35–55 | 38–47 |
| Folic Acid (mcg) | 5–15 | 8–12 |
| Vitamin $B_{12}$ (mcg) | 0.05–0.2 | 0.09–0.15 |
| Biotin (mcg) | 1–4 | 1.5–3 |
| Pantothenic Acid (mcg) | 250–400 | 290–350 |
| Vitamin A (IU) | 180–240 | 200–220 |
| Vitamin D (IU) | 30–60 | 35–55 |
| Vitamin E (IU) | 0.5–2.5 | 1.0–2.0 |
| Vitamin K (mcg) | 4.0–8.0 | 5.0–7.0 |

The beverage according to the invention would be especially beneficial for toddlers/children of 1–10 years of age. Various modifications of components, such as the number and type of lipids, can be made without departing from the fundamental discovery that use of organic brown rice syrup and a source of calcium selected from natural milk mineral, calcium lactate gluconate and mixtures thereof, can produce a physically stable and good tasting nutritional beverage. In a further aspect of the invention, it has been discovered that the use of brown rice syrup as the predominate source of carbohydrate improves the flavor of the beverage by effectively masking the objectionable flavors of the vitamins and minerals. Further, even though the rice syrup has a D.E. of about 42, the sweetness is acceptable and comparable to cow's milk without being over powering. Additionally, it is believed that the beverage according to the invention is the first nutritional beverage to use expeller pressed oils as the source of lipid, thereby avoiding the presence of trace amounts of solvents, such as hexane.

DETAILED DESCRIPTION OF THE PREFERRED EMBODIMENTS

In accordance with the foregoing summary of the invention, the following Example I is one embodiment of the beverage of the present invention and a method of its production. In Example I the following bill of materials was utilized.

| Bill of Materials | | |
|---|---|---|
| Ingredient | Gms per Batch | Gms per 100 kcal |
| NFDM* | 6503.2 | 7.830 |
| Milk Mineral Concentrate | 141.2 | 0.17 |
| Brown Rice Syrup* | 8222 | 9.899 |
| HO Sunflower Oil* | 969.4 | 1.167 |
| Coconut Oil* | 806 | 0.970 |
| Soy Oil* | 2216.8 | 2.669 |
| Soy Lecithin | 42.8 | 0.052 |
| Vanilla Flavor | 26.4 | 0.032 |
| Oil Soluble Vitamin Premix | 41.6 | 0.050 |
| Water Soluble Vitamin Premix | 137 | 0.165 |
| TOTAL | 19106.2 | 23.003 |

*materials were certified organic

To convert from gms per 100 kcal to 100 ml of RTF beverage one multiplies the gms per 100 kcal by 0.7 to arrive at per 100 ml of RTF. To convert from gms per 100 kcal to 100 gms of powder one uses 4.733 as the factor. The organic NFDM was obtained from Horizon Dairy of Boulder, Colo.; the organic soy organic, HO (high oleic) sunflower and organic coconut oils were obtained from Spectrum Commodities of Petaluma, Calif.; the soy lecithin was obtained from Central Soya Company, Inc., Fort Wayne, Ind.; the organic brown rice syrup was obtained from California Natural Products of Lathrop, Calif.; the organic vanilla flavor was obtained from Givaudan Roure of Cincinnati, Ohio; the natural milk mineral was obtained from MD Foods Ingredients, Inc. North America of Union, N.J.; and the water soluble vitamin premix and oil soluble vitamin premix were supplied by Fortitech, Inc. of Schenectady, N.Y.

EXAMPLE I

Production of Beverage Containing Natural Milk Mineral and Organic Brown Rice Syrup A 17.75 kg batch of powder was manufactured using the process described below. In the first step, an appropriate amount of warm water (less than 120–130° F.) was added to a blend tank and the NFDM followed by the natural milk mineral concentrate was then added. Mixing occurred until the natural milk mineral and the NFDM was completely wetted and dispersed. The brown rice syrup was then added to the tank and agitation continued for 35 minutes. In a separate kettle the HO sunflower oil and the soybean oil were heated to 120–130° F. and then the solid coconut oil was added. Mixing continued until the lipid slurry was homogenous. The lecithin was then added, followed by the oil soluble vitamin premix. The oil blend was then added to the protein/carbohydrate slurry and this mixture was then heated to 150° F. The water soluble vitamin premix was dissolved in 150 gms of warm water and then added to the protein/carbohydrate/oil slurry and mixed for 5 minutes. The pH was checked and adjusted to 6.65–6.85 with 10% NaOH. KOH could also be used. Mixing continued for an additional 25 minutes and then the blend was heated to 160° F. The vanilla flavor was then added. The blend was about 50% by weight total solids.

The blend was prepared for spray drying by first homogenizing at 2500/500 psi and then placing the blend in the spray dryer balance tank. The spray dryer used a 2000 psi nozzle pressure (a 72/1000 nozzle), with a 258° F. inlet temperature and an outlet temperature of 250° F. The resulting powder (1.7% water by weight) was fine, slightly tan in color and reconstituted readily. The powder was then placed in metal cans flushed with a mixture of carbon dioxide and nitrogen.

The beverage of the present invention can be made in a ready to consume form, in the form of a concentrate or in powder form. The nutritional beverage of the present invention, due to its use of brown rice syrup, has been found to produce a refreshing, pleasant tasting beverage with excellent mouthfeel and smooth texture.

INDUSTRIAL APPLICABILITY

Some patients, infants and toddlers in need of nutritional supplementation simply do not like or should not be exposed to the chemical residues that are present in commercially available nutritional products. The product of this invention will also offer patients, infants and toddlers in need of calcium and/or iron supplementation a new supplement that will improve intake and thereby improve nutritional status. The organic product of this invention provides a high level of nutritional value in a beverage which will be found useful in the medical community and readily accepted by parents of infants that know the value of organic products.

In accordance with the foregoing disclosure, it will be within the ability of one skilled in the relevant arts to make modifications to the present invention, such as through the substitution of equivalent materials and/or their amounts, without departing from the spirit of the invention as reflected in the appended claims.

We claim:

1. A ready-to-feed nutritional beverage comprising:
   a) water;
   b) from about 8 to about 12 gms of an organic brown rice syrup per 100 kcal of beverage; and
   c) from about 0.1 to about 1.0 gms per 100 kcal of a source of calcium selected from the group consisting of natural milk mineral, calcium lactate gluconate and mixtures thereof.

2. The beverage according to claim 1 wherein said source of calcium is natural milk mineral.

3. The beverage according to claim 2 wherein said natural milk mineral is at a concentration of about 0.15 to about 0.19 gms per 100 kcal of beverage.

4. The beverage according to claim 1 wherein said beverage additionally comprises:
   a) at least one element elected from the group consisting of: pantothenic acid, biotin, vitamin $B_{12}$, folic acid, vitamin $B_6$, niacin, vitamin $B_2$, vitamin $B_1$ and a source of bioavailable iron; and
   b) from about 6 to about 10 gms of at least one source of organic protein per 100 kcal.

5. The beverage according to claim 4, wherein said beverage additional comprises:
   a) at least one oil soluble vitamin; and
   b) wherein said beverage has a pH of from about 6.8 to about 7.2.

6. The beverage according to claim 1 wherein said beverage additional comprises:
   a) soy lecithin; and
   b) at least one natural flavor.

7. The beverage according to claim 1 wherein said beverage is in the form of a concentrate or a powder.

8. The beverage according to claim 1 wherein said organic brown rice syrup has a D.E. of at least 25.

9. An organic nutritional beverage comprising:
   a) non-fat dry milk;
   b) natural milk mineral concentrate;
   c) brown rice syrup;
   d) high oleic sunflower oil;
   e) coconut oil;
   f) soy bean oil;
   g) soy lecithin;
   h) flavor;
   i) oil soluble vitamins; and
   j) water soluble vitamins.

10. A nutritional beverage according to claim 1 or 9 additionally containing at least one of eicosapentaenoic acid (EPA) and docosahexenoic acid (DHA).

* * * * *